United States Patent
Baudart

(10) Patent No.: US 7,571,950 B2
(45) Date of Patent: Aug. 11, 2009

(54) REINFORCING STRUCTURE FOR A MOTOR VEHICLE CAPABLE OF LIMITING DASHBOARD VIBRATIONS AND CORRESPONDING MOTOR VEHICLE

(75) Inventor: Laurent Baudart, Fresnoy En Thelle (FR)

(73) Assignee: Faurecia Interieur Industrie, Nanterre (FR)

( * ) Notice: Subject to any disclaimer, the term of this patent is extended or adjusted under 35 U.S.C. 154(b) by 117 days.

(21) Appl. No.: 11/887,924

(22) PCT Filed: Mar. 16, 2006

(86) PCT No.: PCT/FR2006/000590

§ 371 (c)(1),
(2), (4) Date: Dec. 11, 2007

(87) PCT Pub. No.: WO2006/106197

PCT Pub. Date: Oct. 12, 2006

(65) Prior Publication Data

US 2009/0039668 A1    Feb. 12, 2009

(30) Foreign Application Priority Data

Apr. 6, 2005   (FR) .................................. 05 03449

(51) Int. Cl.
B62D 25/14   (2006.01)
(52) U.S. Cl. ............... 296/72; 296/70; 180/90
(58) Field of Classification Search .......... 296/70, 296/72, 74; 180/90
See application file for complete search history.

(56) References Cited

U.S. PATENT DOCUMENTS

| | | | | |
|---|---|---|---|---|
| 5,868,426 A | * | 2/1999 | Edwards et al. | ............. 280/779 |
| 6,315,347 B1 | * | 11/2001 | Gotz | ............................ 296/72 |
| 6,644,690 B2 | * | 11/2003 | Brownlee et al. | ........... 280/779 |
| 7,048,325 B1 | * | 5/2006 | Sandhu | ................... 296/193.02 |

FOREIGN PATENT DOCUMENTS

| | | |
|---|---|---|
| DE | 101 01 648 A1 | 7/2002 |
| DE | 101 52 242 A1 | 9/2003 |
| EP | 1 298 035 A1 | 4/2003 |
| FR | 2 859 445 A | 3/2005 |

* cited by examiner

Primary Examiner—Lori L Lyjak
(74) Attorney, Agent, or Firm—Young & Thompson

(57) ABSTRACT

A motor vehicle reinforcing structure includes an instrument panel crosspiece (1) fixed between the left and right front pillars (2) of the vehicle, and a hollow tube (7) having a length substantially less than the instrument panel crosspiece (1) and substantially parallel to the instrument panel crosspiece, and the hollow tube (7) being fixed to an end portion of the instrument panel crosspiece (1). The hollow tube (7) is rigidly fixed to the instrument panel crosspiece by first and second linking elements (8, 9) so as to form a quadrilateral therewith and through its end proximate the end of the instrument panel crosspiece (1) to the pillar (2) adjacent the vehicle by a threaded element (20) whereof the axis is parallel to the axis of the hollow tube (7) and is inscribed in an inner volume of the hollow tube (7).

17 Claims, 5 Drawing Sheets

REINFORCING STRUCTURE FOR A MOTOR VEHICLE CAPABLE OF LIMITING DASHBOARD VIBRATIONS AND CORRESPONDING MOTOR VEHICLE

The present invention relates to a reinforcing structure for a motor vehicle, comprising a dashboard cross-member which is fixed with the ends thereof to the front left and front right pillars of the vehicle, and a hollow tube which has a length which is substantially less than that of the dashboard cross-member and which is substantially parallel with the dashboard cross-member, the hollow tube being fixed to an end portion of the dashboard cross-member. The hollow tube is rigidly fixed on the one hand to the dashboard cross-member by a first and a second connection element so as to form a quadrilateral therewith and, on the other hand, with the end thereof close to the end of the dashboard cross-member, to the adjacent pillar of the vehicle by means of a traction element which is provided in the cross-section of the hollow tube.

The patent FR A 2 853 878 describes a reinforcing structure of the above-mentioned type.

A reinforcing structure of this type must be fixed to the lower windscreen cross-member in order to allow a level of vibration damping which is acceptable in terms of the comfort of the occupants of the vehicle.

The object of the invention is therefore to provide a reinforcing structure which has an acceptable level of vibration damping at a reduced cost.

The invention therefore relates to a reinforcing structure for a motor vehicle, comprising a dashboard cross-member which is fixed with the ends thereof to the front left and front right pillars of the vehicle, and a hollow tube which has a length which is substantially less than that of the cross-member of the dashboard and which is substantially parallel with the cross-member of the dashboard, the hollow tube being fixed to an end portion of the dashboard cross-member. The hollow tube is fixed rigidly, on the one hand, to the cross-member of the dashboard by a first and a second connection element so as to form a quadrilateral therewith and, on the other hand, with the end thereof close to the end of the cross-member of the dashboard, to the adjacent pillar of the vehicle by means of a traction element which is provided in the cross-section of the hollow tube.

Other features of the invention are:
the traction element is a threaded element whose axis is parallel with the axis of the hollow tube;
the quadrilateral is substantially a rectangle;
it further comprises a member for connecting the hollow tube to the lower windscreen cross-member, which member is fixed to the hollow tube in a detachable manner;
the connection member is fixed to the hollow tube by means of at least one threaded element;
the connection member comprises, at the end thereof for fixing to the hollow tube, at least one rigid support member which comprises a through-hole for the threaded element; and the hollow tube comprises at least one fixing member which comprises a support surface for the support member and which is provided with a tapped hole for receiving the threaded element;
the support member is a casing which is constituted by a folded sheet comprising two parallel faces;
each fixing member is constituted by a folded sheet which is provided with a nut which is fixedly joined to the fixing member, remote from the connection member, relative to the support surface; and
the support member comprises, on the face thereof remote from the fixing member, and substantially in the axis of the passage, a floating nut which is retained against the support member by means of attachments.

The invention also relates to a motor vehicle which is provided with a reinforcing structure as defined above.

The invention will be better understood from a reading of the following description, given purely by way of example and with reference to the appended drawings, in which.

In the remainder of the text, the orientations used are the conventional orientations of a motor vehicle. In this manner, the terms "front", "rear", "right" and "left" are intended to be understood with respect to the travel direction of the vehicle and the position of the driver. Furthermore, the directions x, y and z are the longitudinal, transverse and vertical directions of the vehicle.

Figure 1:
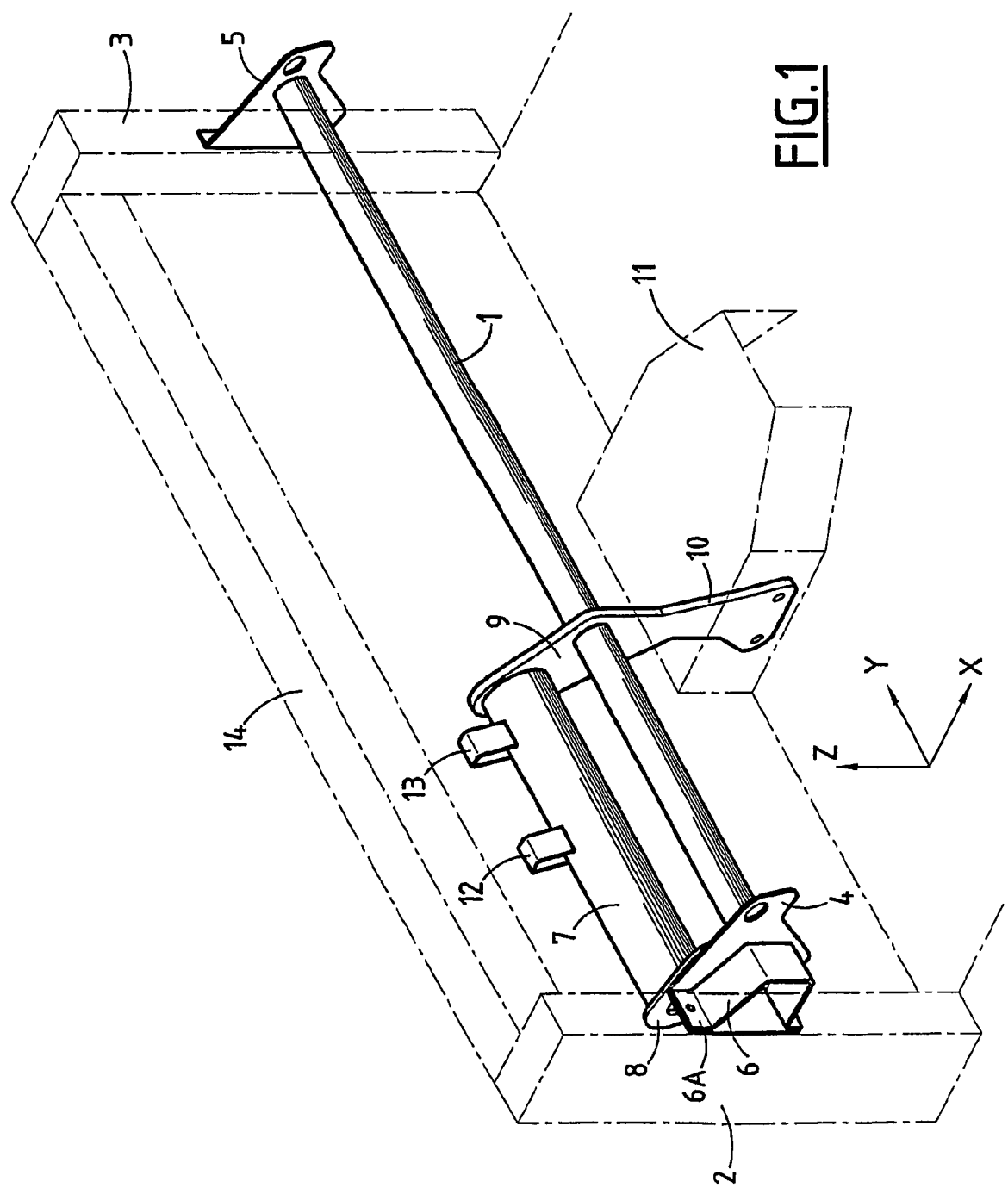
FIG. 1 is a perspective view of the reinforcing structure according to the invention.

With reference to FIG. 1, a reinforcing structure is illustrated in perspective, the viewer being at the rear left-hand side of the vehicle facing forwards. The elements of the bodywork of the vehicle surrounding the reinforcing structure are illustrated with a notional line.

The reinforcing structure comprises a cross-member of the dashboard 1 which is fixed between the front left pillar 2 and front right pillar 3 of the vehicle by means of two L-shaped components 4, 5 which are each reinforced by means of a bracket 6 (only the left-hand bracket is illustrated). Each assembly 4 to 6 comprises a rim 6A which is fixed to the associated pillar by means of screws which are orientated in the x direction.

A hollow tube 7 which has a length which is substantially less than the cross-member of the dashboard 1 is mounted substantially parallel therewith and in front thereof.

The hollow tube 7 is rigidly fixed to an end portion of the dashboard cross-member 1 by means of two end-plates 8, 9 which form connection elements.

The cross-member of the dashboard 1, the hollow tube 7 and the two end-plates 8, 9 form a quadrilateral. This quadrilateral is preferably a rectangle.

A member 10 which may or may not be integrated in the end-plate 9 provides the connection between this end-plate and the body tunnel 11 to which it is rigidly fixed by means of screws which are orientated in the y direction. The member 10 thus contributes to the rigidity of the assembly.

Two fixing components 12 and 13, whose function will be explained below, are welded to the upper portion of the hollow tube 7.

The lower windscreen cross-member 14 is positioned in front of the structure which is constituted by the cross-member of the dashboard 1 and the hollow tube 7 and is also fixed rigidly to the two front pillars 2, 3 of the body.

Figure 2:
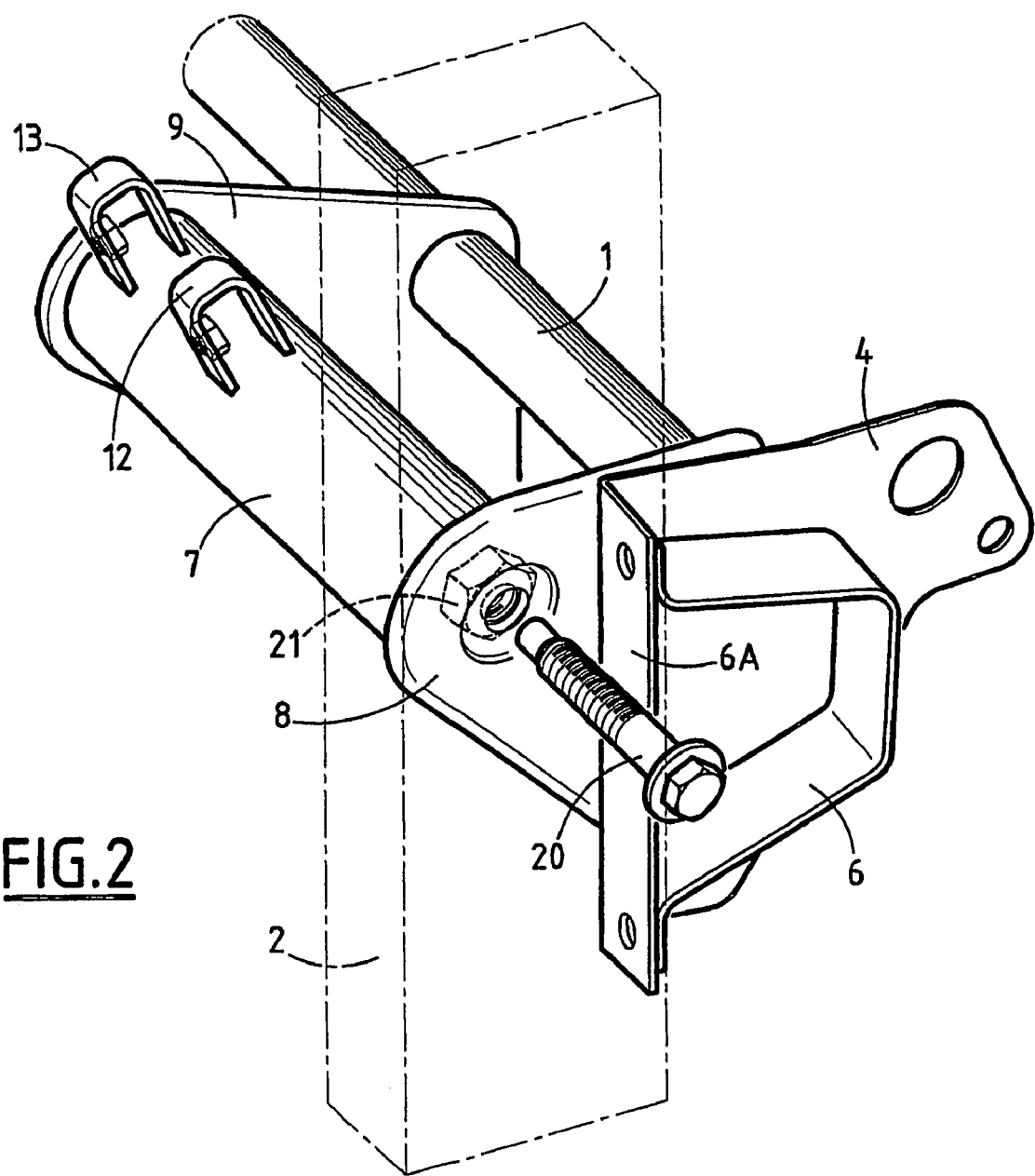
FIG. 2 is a perspective view of the system for attaching the reinforcing structure to the front left pillar of the vehicle.

Furthermore, a screw 20 in FIG. 2 extends through the pillar 2 and the end-plate 8 and is screwed in a nut 21 which is fixedly joined at the inner side of the hollow tube 7 in such a manner that the axis of the screw 20 is parallel with the axis of the hollow tube 7 and is defined in the cross-section thereof.

The screw 20, which is orientated in the y direction, thus produces a rigid connection between the pillar 2 and the hollow tube 7.

This rigid connection advantageously allows the vibrations of the reinforcing structure and therefore of the dashboard itself to be reduced.

In this manner, the Applicant has found that, for conventional vehicles and motorised arrangements, it was no longer necessary to provide a rigid mechanical connection between the reinforcing structure and the lower windscreen cross-member 14.

The replacement of this mechanical connection with a simple threaded element 20 thus allows a particularly advantageous cost saving.

Furthermore, this rigid connection also allows the quantity of material used in the reinforcing structure to be reduced, which provides a saving with respect to the cost and weight of the materials used.

However, the Applicant has also found that large engines, such as V6 engines, generate vibrations which the above structure is not capable of damping sufficiently and therefore require a rigid mechanical connection to be maintained with the lower windscreen cross-member 14.

Since this was found only for specific engines which generally represent a small percentage of all engines which are provided for a specific type of vehicle, it is advantageous, for a specific type of vehicle on which a plurality of motorised arrangements are installed, to provide an optional mechanical fixing means which is mounted only when necessary. This advantageously allows costs to be reduced.

Figure 3:
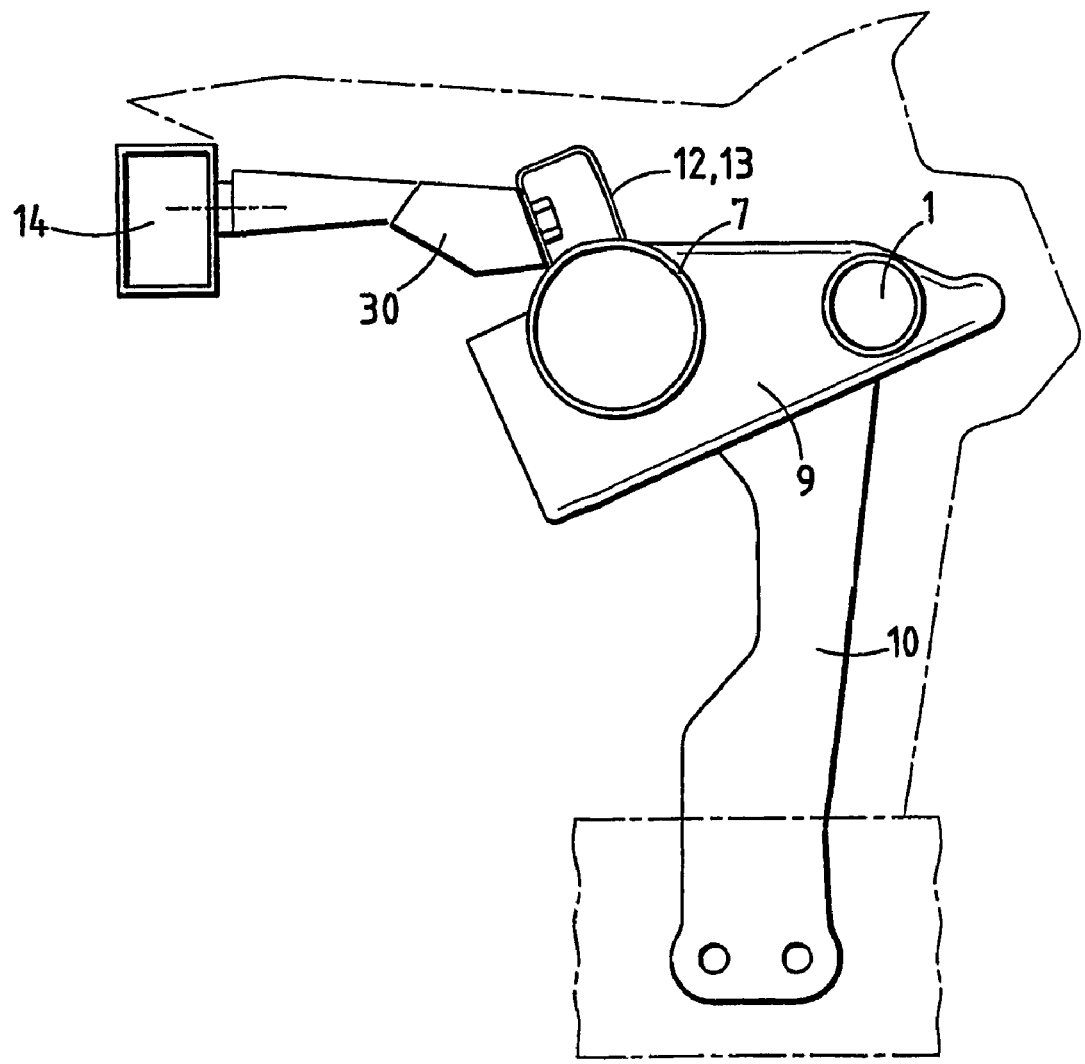
FIG. 3 is a side view of the reinforcing structure and the member thereof for connection to the lower windscreen cross-member.

A connection member 30, FIG. 3, is conventionally fixed rigidly to the lower windscreen cross-member 14 and comprises two rear ends, each of which is screwed to the hollow tube 7 by means of one of the fixing members 12, 13.

Figure 4:
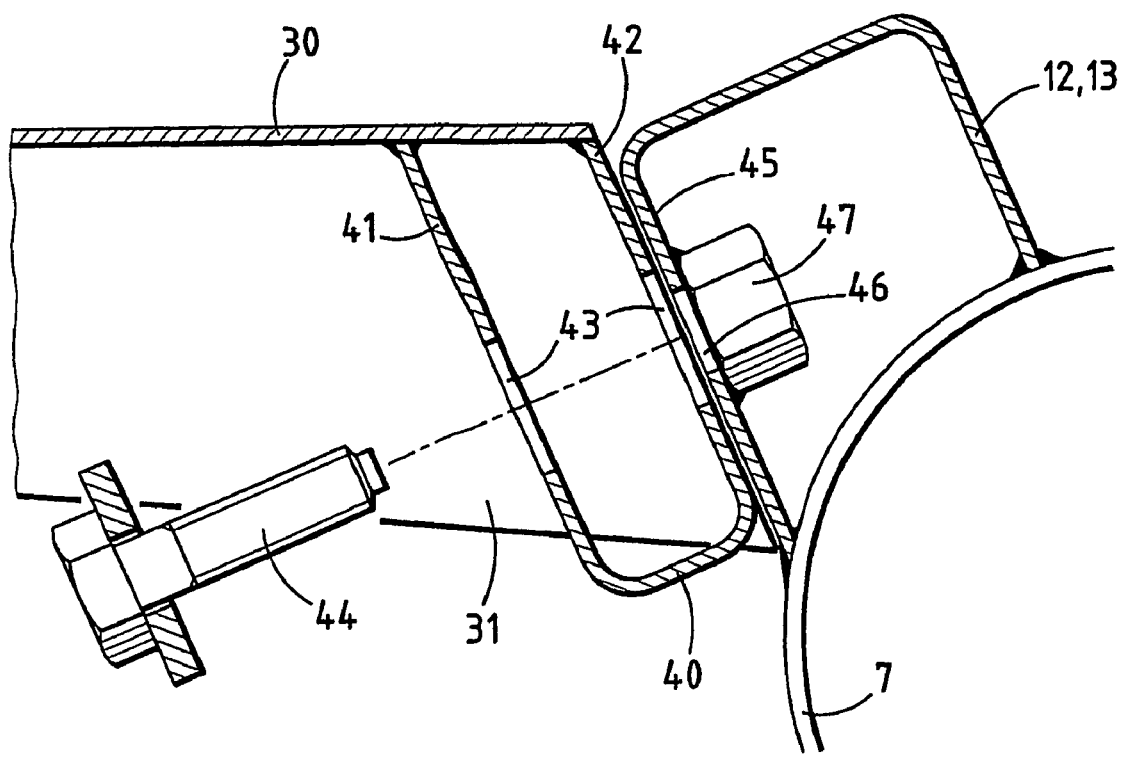
FIG. 4 is a sectioned view of a first embodiment of the connection between the connection member of FIG. 3 and the reinforcing structure.

The connection member 30 comprises in FIG. 4 a U-shaped end portion 31 which is close to the fixing members 12, 13. A folded sheet 40 is welded to the inner side of this end portion in order to produce a rigid casing which forms a support member.

Preferably, the sheet is folded so that it forms two parallel faces 41, 42.

These two parallel faces 41, 42 are each perforated by a hole 43 which allows a screw 44 to pass through.

The fixing members 12, 13 which are welded to the hollow tube 7 are preferably composed of a folded sheet which comprises a face 45 which is perforated by a hole 46 which allows the screw 44 to pass through and which is provided with a nut 47 which is fixedly joined to the face 45, at the opposite side, relative to the support surface 45, of the connection member 30.

The screw 44, being screwed into the nut 47 of each fixing member 12, 13, fixedly joins the support member 40 and each fixing member 12, 13, the surfaces 42, 45 being pressed one against the other.

Figure 5:
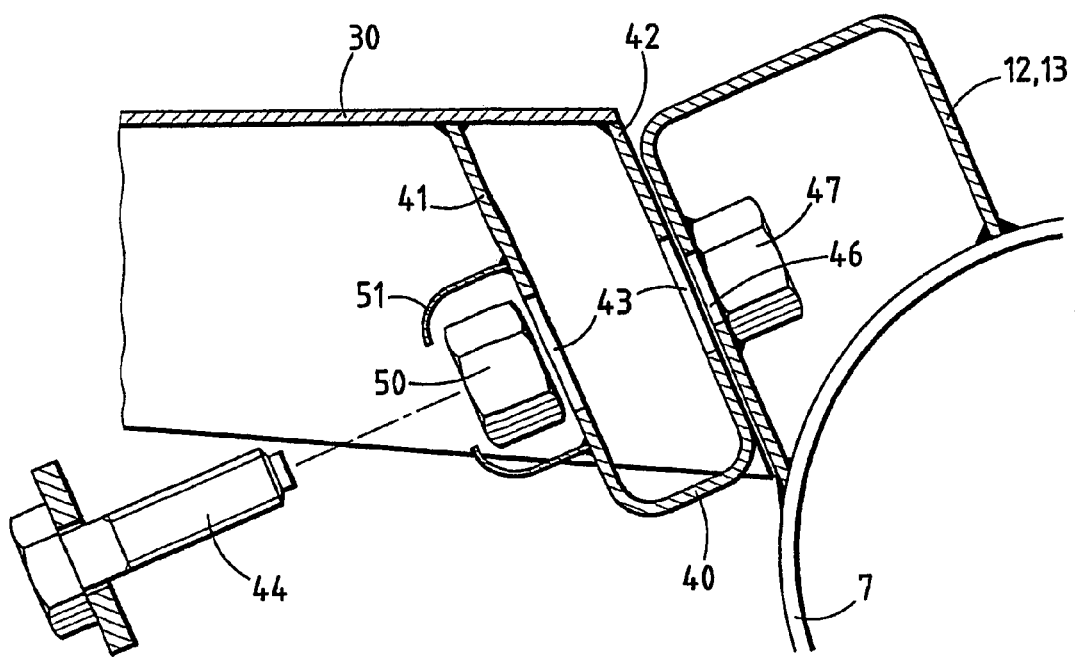
FIG. 5 is a sectioned view of a second embodiment of the connection between the connection component of FIG. 3 and the reinforcing structure.

In another embodiment, in FIG. 5, the support member 40 comprises, on the face 41 thereof opposite the fixing member 12, 13 and substantially in the axis of the passage of the threaded element 44, a floating nut 50 which is retained against the support member 40 by means of attachments 51.

This embodiment advantageously allows greater assembly tolerances to be absorbed.

The invention claimed is:

1. Reinforcing structure for a motor vehicle, comprising a dashboard cross-member (1) which is fixed with the ends thereof to the front left and front right pillars (2, 3) of the vehicle, and a hollow tube (7) which has a length which is substantially less than that of the dashboard cross-member (1) and which is substantially parallel with the dashboard cross-member, the hollow tube (7) being fixed to an end portion of the dashboard cross-member (1), characterised in that the hollow tube (7) is rigidly fixed on the one hand to the dashboard cross-member by a first and a second connection element (8, 9) so as to form a quadrilateral therewith and, on the other hand, with the end thereof close to the end of the dashboard cross-member (1), to the adjacent pillar (2) of the vehicle by means of a traction element (20) which is provided in the cross-section of the hollow tube.

2. Reinforcing structure according to claim 1, characterised in that the traction element (20) is a threaded element whose axis is parallel with the axis of the hollow tube (7).

3. Reinforcing structure according to claim 1, characterised in that the quadrilateral is substantially a rectangle.

4. Reinforcing structure according to claim 1, characterised in that it further comprises a member (30) for connecting the hollow tube (7) to the lower windscreen cross-member (14) which member is fixed to the hollow tube in a detachable manner.

5. Reinforcing structure according to claim 4, characterised in that the connection member (30) is fixed to the hollow tube (7) by means of at least one threaded element (44).

6. Reinforcing structure according to claim 5, characterised in that the connection member (30) comprises, at the end thereof for fixing to the hollow tube (7), at least one rigid support member (40) which comprises a through-hole (43) for the threaded element (44); and the hollow tube (7) comprises at least one fixing member (12, 13) which comprises a support surface (45) for the support member (40) and which is provided with a tapped hole (47) for receiving the threaded element (44).

7. Reinforcing structure according to claim 6, characterised in that the support member (40) is a casing which is constituted by a folded sheet comprising two parallel faces (41, 42).

8. Reinforcing structure according to claim 6, characterised in that each fixing member (12, 13) is constituted by a folded sheet which is provided with a nut (47) which is fixedly joined to the fixing member, remote from the connection member (30), relative to the support surface (45).

9. Reinforcing structure according to claim 6, characterised in that the support member (40) comprises, on the face thereof remote from the fixing member (12, 13), and substantially in the axis of the passage, a floating nut (50) which is retained against the support member by means of attachments (51).

10. Motor vehicle, characterised in that it comprises a reinforcing structure according to claim 1.

11. Reinforcing structure according to claim 2, characterised in that the quadrilateral is substantially a rectangle.

12. Reinforcing structure according to claim 2, characterised in that it further comprises a member (30) for connecting the hollow tube (7) to the lower windscreen cross-member (14) which member is fixed to the hollow tube in a detachable manner.

13. Reinforcing structure according to claim 3, characterised in that it further comprises a member (30) for connecting the hollow tube (7) to the lower windscreen cross-member (14) which member is fixed to the hollow tube in a detachable manner.

14. Reinforcing structure according to claim 11, characterised in that it further comprises a member (30) for connecting the hollow tube (7) to the lower windscreen cross-member (14) which member is fixed to the hollow tube in a detachable manner.

15. Reinforcing structure according to claim 7, characterised in that each fixing member (12, 13) is constituted by a folded sheet which is provided with a nut (47) which is fixedly joined to the fixing member, remote from the connection member (30), relative to the support surface (45).

16. Reinforcing structure according to claim 7, characterised in that the support member (40) comprises, on the face thereof remote from the fixing member (12, 13), and substantially in the axis of the passage, a floating nut (50) which is retained against the support member by means of attachments (51).

17. Reinforcing structure according to claim 8, characterised in that the support member (40) comprises, on the face thereof remote from the fixing member (12, 13), and substantially in the axis of the passage, a floating nut (50) which is retained against the support member by means of attachments (51).

* * * * *